(12) United States Patent
Chong et al.

(10) Patent No.: US 10,571,629 B1
(45) Date of Patent: Feb. 25, 2020

(54) WAVEGUIDE FOR AN INTEGRATED PHOTONIC DEVICE

(71) Applicant: UNIVERSITY OF SOUTHAMPTON, Hampshire (GB)

(72) Inventors: Harold Chong, Hampshire (GB); Rafidah Petra, Hampshire (GB); Graham Reed, Hampshire (GB); Swe Zin Oo, Hampshire (GB); Antulio Tarazona, Hampshire (GB)

(73) Assignee: UNIVERSITY OF SOUTHAMPTON, Hampshire (GB)

( * ) Notice: Subject to any disclaimer, the term of this patent is extended or adjusted under 35 U.S.C. 154(b) by 0 days.

(21) Appl. No.: 15/999,071

(22) Filed: Aug. 17, 2018

(51) Int. Cl.
*G02B 6/122* (2006.01)
*G02B 6/12* (2006.01)

(52) U.S. Cl.
CPC .......... *G02B 6/122* (2013.01); *G02B 6/12002* (2013.01); *G02B 6/1228* (2013.01); *G02B 2006/1213* (2013.01); *G02B 2006/12061* (2013.01); *G02B 2006/12176* (2013.01)

(58) Field of Classification Search
None
See application file for complete search history.

(56) References Cited

U.S. PATENT DOCUMENTS

| | | | | |
|---|---|---|---|---|
| 4,762,382 A * | 8/1988 | Husain | ................ | G02B 6/125 385/132 |
| 6,603,915 B2 * | 8/2003 | Glebov | ............. | G02B 6/12004 385/129 |
| 7,577,323 B2 * | 8/2009 | Iwamori | ............ | G02B 6/12002 257/734 |
| 2002/0159739 A1 * | 10/2002 | Yang | .................. | G02B 6/12004 385/129 |
| 2004/0017962 A1 * | 1/2004 | Lee | ...................... | G02B 6/4201 385/14 |
| 2005/0169593 A1 * | 8/2005 | Hwang | ............. | G02B 6/12004 385/131 |
| 2007/0147761 A1 * | 6/2007 | Kwakernaak | ...... | G02B 6/12002 385/131 |
| 2009/0214170 A1 * | 8/2009 | Wei | .................. | B29D 11/00663 385/129 |
| 2011/0150386 A1 * | 6/2011 | Dupuis | ............ | B29D 11/00663 385/14 |
| 2014/0270642 A1 * | 9/2014 | Frish | ........................ | G02B 6/34 385/37 |

OTHER PUBLICATIONS

"Flerovium", Periodic Table of Elements: Los Alamos National Laboratory. Page retrieved Feb. 2, 2019 via https://periodic.lanl.gov/114.shtml. (Year: 2019).*

* cited by examiner

*Primary Examiner* — Michael Stahl
(74) *Attorney, Agent, or Firm* — Lando & Anastasi, LLP

(57) ABSTRACT

An integrated photonic device comprising at least a first integrated photonic component supported by a substrate extending substantially in a plane of the device and optically isolating cladding facing the first integrated photonic component, the photonic device further comprising a waveguide formed by a deposited layer of group IV semiconductor material to extend on a slope in a direction out of the plane of the substrate, the waveguide arranged to, in use, couple light from/to the integrated photonic component through the optically isolating cladding.

28 Claims, 9 Drawing Sheets

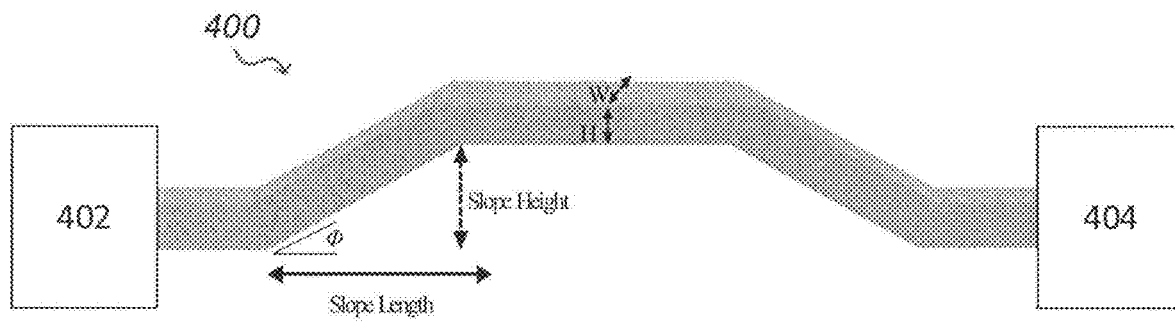
FIG. 4A
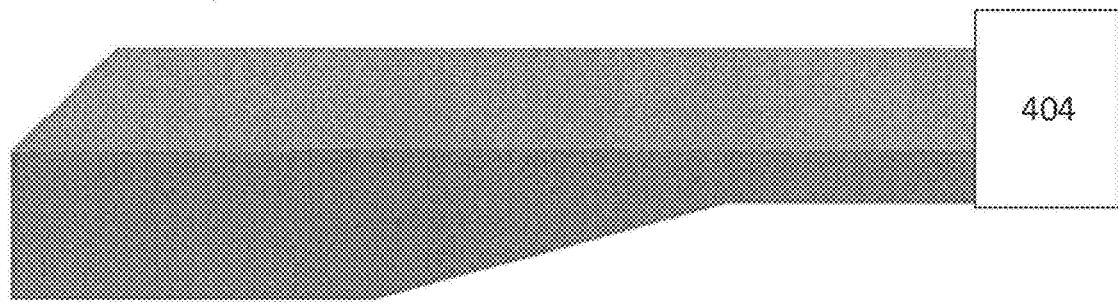
FIG. 4B
Forming the waveguide by a layer of deposited group IV semiconductor material to extend on a slope in a direction out of the plane of the substrate — 502
FIG. 5

WAVEGUIDE FOR AN INTEGRATED PHOTONIC DEVICE

This invention relates to integrated photonic devices, in particular to waveguides provided in such devices to couple light from/to an integrated photonic component of the device, the waveguides formed by a deposited layer of group IV semiconductor material.

BACKGROUND

Integrated photonics is currently a fast growing and increasingly mature technology that enables the production of low-cost, highly scalable integrated optical devices including circuits and components designed for applications in, for example, high speed optical communications, sensing and experimental physics. In particular, the design and development of integrated photonic devices provided on a Silicon On Insulator (SOI) wafer architecture is revolutionizing the field of optical communications, allowing the realization of compact, low power circuits that can be seamlessly integrated to electrical circuits, thus allowing for dense optical circuits integration.

Integrated optical components such as modulators, optical filters, photodetectors, arrayed waveguide gratings (AWGs), couplers, wavelength division multiplexers and all-optical wavelength converters have successfully been demonstrated, showing that multiple functions can be effectively integrated in a single integrated photonic chip. As these components can be now realized in μm-scale circuits, compact low power silicon photonic devices are now able to replace bulk components. For example, silicon photonic optical transceivers, packaged in standard QSFP28 form factor, are now available, supporting speeds up to 100 Gb/s, usable for high speed intra-data centre connections, which allows the replacement of copper cables and other bulk components.

Although the technology is already relatively mature, some significant technical challenges need to be addressed. For example, with ongoing developments in the technology, the number of photonic components within a product and the demands, and consequently complexity, of each device has been increasing. Thus, there is a constant need for smaller, higher density devices.

Current Photonic Integrated Circuit (PIC) chips are generally being designed to lay out photonic components and waveguides across the two-dimensional plane of the chip wafer such that the guiding and interaction of the light is constrained at a single 'level' or in a single photonic 'layer' within the device. In this two-dimensional, single layer PIC chip layout, the interconnecting optical waveguides can make up the bulk of the photonic devices. As a result, despite the promise of integrated photonics to miniaturise discrete optical components, PIC chips designs have not yet reached the circuit density of a microprocessor. For example, the current power transfer rate requirement for optical signals on a two-dimensional modulator chip of ~100 fJ per bit has to meet the electronic driver circuit performance in terms of switching power, speed and thermal management.

Such a two-dimensional photonic circuit layout will be disadvantaged due to space restriction for integration with its electronic counterparts. This is restricting the uptake in the market of integrating multifunctional optical processing chips with integration with VLSI electronic chips. This limitation will have an impact on the development and large-scale adoption of PICs for optical data processing, in particular for communication and medical imaging applications. Despite this, the silicon photonics technology market value is already estimated to be USD 0.5 billion in 2017 and forecasted to grow to USD 1.6 billion by 2022. This evaluation is based on the existing two-dimensional discrete component systems such as transceivers, modulators and attenuators.

Therefore, solutions to increase the circuit density of PICs would facilitate the market adoption and further expansion of integrated photonics.

One approach to realising higher density optical systems would be to develop and fabricate PICs having a three-dimensional photonic integrated circuit architecture. In these three-dimensional PIC chip designs, integrated photonic circuits and components would be fabricated to be located at different "levels" or heights in the plane of the chip relative to each other. Such PIC chips may generally be referred to as "multilayer" PICs, as there may be integrated photonic components or circuits or 'layered' over another. A move to a three-dimensional PIC chip architecture would enable accommodation in the same chip wafer of more active and passive optical devices and, importantly, the optical interconnect waveguides that carry the signals within and between different layers within the same chip. This would allow for a denser integration that would further enhance the ability of PICs to provide commercially viable high circuit density functions of photonic detection, conditioning, modulation, multiplexing and demultiplexing (MUX-DEMUX). The introduction of higher density PICs using three-dimensional silicon photonics technology would thus add a new market share, especially in the data communication, healthcare imaging and sensor sectors. A move toward a three-dimensional or multilayer architecture that allows effective high-density PIC chips to be deployed is therefore desirable. Discrete photonic devices using a three-dimensional PIC architecture have been demonstrated in the lab, which perform a single operation, such as power splitting and coupling. However, there are no definitive three-dimension optical chips on the market.

It is in this context that the presently disclosure has been devised.

BRIEF SUMMARY OF THE DISCLOSURE

In consideration of the context of the above background, the present inventors have realised that the effectiveness of three-dimensional PIC chip design and the commercial viability of devices fabricated using this architecture is limited by the ability to effectively communicate between photonic layers of the device. Interlayer optical coupling methods based on evanescent coupling and grating coupler approaches depend on complex alignment of components between the layers and optical mode conditioning to achieve coupling, and thus complex design and fabrication methods are needed. These approaches to interlayer coupling in any case provide only limited communication bandwidth and are polarisation sensitive.

To address this, viewed from one aspect, the present disclosure provides an integrated photonic device comprising at least a first integrated photonic component supported by a substrate extending substantially in a plane of the device and optically isolating cladding facing the first integrated photonic component, the photonic device further comprising a waveguide formed by a deposited layer of group IV semiconductor material to extend on a slope in a direction out of the plane of the substrate, the waveguide arranged to, in use, couple light from/to the integrated photonic component through the optically isolating cladding.

Viewed from another aspect, the present disclosure provides a method of fabrication of a slope waveguide within an integrated photonic device, the integrated photonic device comprising a first integrated photonic component supported by a substrate extending substantially in a plane of the device, the waveguide arranged to, in use, couple light from/to the first integrated photonic component through optically isolating cladding, the method comprising forming the waveguide by a layer of deposited group IV semiconductor material to extend on a slope in a direction out of the plane of the substrate.

Viewed from another aspect, the present disclosure provides a method of fabrication of a layered silicon integrated photonic device, the method comprising fabrication of a first photonic layer comprising one or more first integrated photonic components; after the fabrication of the first photonic layer, fabrication of the waveguide; and, after the fabrication of the waveguide, fabrication of a second photonic layer comprising one or more second integrated photonic components.

The waveguide of the present invention enables light to be coupled to or from a photonic component of the photonic material and to extend guide the coupled light on a slope in a direction out of the plane of the photonic material to allow for the provision of three dimensional devices with low loss. This also allows for the connection of components in a photonic layer of a device to other components either in the same plane or at substantially the same height or level in the photonic device (that could not be reached through extension in the same plane due to, for example, a component blocking the path) or in a different plane or at a substantially different height or level in the photonic device.

The waveguides of the present disclosure are fabricated on the slope geometry of the cladding or another material layer of the photonic device to couple light directly from one layer to another. This removes the need for a high precision, high complexity fabrication method and enables an accurate and effective waveguide to be fabricated.

Further, the slope coupler waveguides of the present disclosure are relatively short (in examples, the slope angle being in the range of 10-15 degrees allows coupling of light to different heights within the three-dimensional structure over a relatively short distance). The relatively small dimensions needed to achieve coupling between layers of the device allows for a high density of circuits and components on the device. The shorter the waveguides, the better the device density integration that will ultimately produce the desired multifunction optical chips.

In developing the waveguide couplers disclosed herein, the present inventors realised that coupling light from/to an integrated photonic component using a slope waveguide formed by a deposited layer of group IV semiconductor material would provide an advantageous means of providing a small and dense three-dimensional integrated photonic device with efficient linking of different optical layers. This addresses the interlayer bottleneck issue and enables three-dimensional high density integrated photonic circuits.

The slope waveguide design is adaptable for inorganic or organic optical materials and offers low loss, broad optical bandwidth and ease of fabrication for flexible interlayer cladding separation. Thus, the slope waveguide enables vertical freedom for direct coupling, allowing transport of light up or down in a height direction of the three-dimensional integrated photonic device over a relatively large cladding height.

The term "three-dimensional" used in relation to an integrated photonic device as used herein will generally be understood to mean that photonic components are provided at substantially different heights relative to each other in at least part of the photonic device, and that light is coupled between those components to traverse that height in a direction orthogonal to the plane of the device wafer. In the present disclosure that coupling is achieved with the slope coupler. The term "multilayer" photonic device as used herein will generally be understood to similarly mean that multiple photonic components are provided at substantially different heights in the plane of the integrated photonic device wafer, such that one 'layer' of one or more components may be provided 'over', 'under', 'above' or 'below' another such layer. The different 'layers' of the device may or may not be provided in different material layers of the wafer device, as differentiated by constituent elements, compounds and dopants, material structure (crystalline, polycrystalline, amorphous), deposition/growth order, or other material components. For example, different 'layers' may be provided in or on the same layer of deposited/grown material where the material has been etched to have different heights in the plane of the wafer, or alternatively the different 'layers' may be provided in or on different layers of deposited material, one above the other.

In an example, a device may include plural deposited or grown layers of material including a crystalline silicon device layer, a silica cladding layer, and an amorphous silicon layer, with one or more photonic components being provided in at least two of the layers, with a slope coupler being formed to couple the components at different heights in the device.

A significant advantage of the slope waveguides of the present disclosure is that the waveguides are formed from a group IV semiconductor material. These slope waveguides enable flexible circuit design using Group IV materials and direct interconnect solution without the need for optical mode conditioning to couple light better in between layers. The use of the Group IV semiconductor material to form the waveguide enables the coupler to be formed using only CMOS compatible processes and can thus be formed as part of an integrated photonic and electronic circuit production process without requiring additional processing steps. Unlike materials such as polymers, most integrated photonics and electronics applications use group IV materials, making the waveguide and fabrication of the waveguide of the present invention universally applicable. Thus, the presently disclosed waveguides are particularly relevant for silicon photonics, for example, on SOI wafer architectures, where it provides an easily integrable way of coupling components in different layers, heights or levels of the device.

Group IV semiconductor materials include carbon, silicon, germanium, tin, lead and flerovium and are used in many devices including memory chips, microprocessors and transistors due to their special properties. For example, silicon is often used in electronic devices because it is a semiconductor of low cost, high efficiency, thermal stability and it can be doped easily to manipulate its electrical properties. A multilayer photonic device will often include components such as transistors and these will often be formed from a group IV material such as silicon. By using a consistent group IV material, such as silicon, optical waveguides, modulators, and photo-detectors can be integrated within a single device. The group IV waveguides of the present disclosure can also be integrated into the single device to enable the device to be three dimensional, thus occupying a smaller area. The manufacturing tools and techniques used to build devices using group IV materials can also be used to form the waveguide. Thus, a waveguide can be manufactured more easily and more quickly.

Moreover, due to the abundance of group IV components and devices, the manufacturing methods to manipulate the group IV materials into devices is advanced and, as such, the implementation of a waveguide formed by group IV material can also use the advanced manufacturing methods without having to introduce new materials and new machinery. Additionally, the group IV semiconductor materials are all compatible with silicon and can therefore be easily integrated with silicon photonic devices.

The method of fabrication of the present invention allows the integrated device to be built up layer by layer without compromising the optical and electronic properties of the device and components within the device. For example, at temperature below 350° C., the method is designed to be compatible with CMOS front and back end of line thermal requirement.

The waveguide of the present invention may be formed from silicon. Silicon has a high refractive index and so the silicon waveguide can be fabricated to be shorter than a waveguide of a lower refractive index because the slope of the waveguide can be at a larger angle while still coupling light in to and out of the waveguide effectively. Therefore, its use as a waveguide material would enable shorter waveguides and better device density. The silicon waveguide effectively increases packaging density and is also compact through bendings.

The optical slope waveguide of the present invention may be formed from amorphous silicon. In examples, such a waveguide has been demonstrated to be able to achieve a transmission loss of 0.27 dB/slope at 1550 nm wavelength.

The photonic device may comprise a second integrated photonic component supported by a substrate extending substantially in a plane of the device facing the optically isolating cladding such that the optically isolating cladding is between the first integrated photonic component and the second integrated photonic component.

The waveguide may be arranged to couple light from/to the second integrated photonic component, optically linking the first integrated photonic component and the second integrated photonic component.

The photonic device may comprise a third integrated photonic component supported by a substrate extending substantially in the same plane of the device as the substrate supporting the first integrated photonic component, wherein the waveguide may be arranged to couple light from/to the third integrated photonic component.

The waveguide may be a slope waveguide comprising an angled slope profile.

The angle of extension of the slope waveguide away from the plane of the substrate supporting the first integrated photonic component may be less than 35°.

The angle of extension of the slope waveguide away from the plane of the substrate supporting the first integrated photonic component may be approximately 10°.

The step height of the slope waveguide may be between 1 μm and 2 μm.

The step height of the slope waveguide may be approximately 1.4 μm.

The width of the slope waveguide may be between 400 nm and 1000 nm.

The width of the slope waveguide may be approximately 600 nm.

The height of the slope waveguide may be less than 1 μm.

The height of the slope waveguide may be approximately 400 nm.

The working wavelength of the waveguide may be 1550 nm.

The cladding thickness may be more than 500 nm.

The waveguide may not be formed from a polymeric material.

The ends of the waveguide may be tapered out to grating couplers.

The height and width of the waveguide may be constant throughout the slope of the waveguide.

The waveguide may be tapered as it extends from the first integrated photonic component.

The photonic device may comprise a resonant structure between the first integrated photonic component and the waveguide.

The waveguide may be formed using a low temperature deposition process.

The integrated photonic device may be a layered integrated photonic device. The substrate extending substantially in a plane of the device that supports the first integrated photonic component may form a first photonic layer comprising one or more integrated photonic components including the first integrated photonic component. The substrate extending substantially in a plane of the device that supports the second integrated photonic component may form a second photonic layer comprising one or more integrated photonic components including the second integrated photonic component. The optically isolating cladding may be a cladding layer between the first and second photonic layers.

The first and second photonic layers may be optically connected by the waveguide.

The first photonic layer may be fabricated, the waveguide may be fabricated after the first photonic layer is fabricated and the second photonic layer may be fabricated after the waveguide is fabricated.

The first photonic layer may be crystalline silicon and the second photonic layer may be amorphous silicon. To provide high speed photonic devices, such as a high-speed modulator, in a silicon photonics PIC, crystalline silicon can be used. Amorphous silicon can't generally be used to provide high speed photonic components such as modulators because the electrodynamics of amorphous silicon are not fast enough. Silicon photonic devices are often provided on wafer structures the form of silicon on insulator (SOI). For multilayer SOIs, a crystalline layer is grown from an amorphous layer using a seed and then an insulator (such as a top oxide (TOX) layer of silica $SiO_2$) is buried between the crystalline silicon layer and silicon layers above (which may be amorphous silicon. The different silicon layers can be used as active photonic layers and therefore it is desirable to connect the with the crystalline silicon layer with these other active layers using the waveguide couplers disclosed herein.

The group IV material may be a silicon-based photonics material.

The group IV material may comprise at least one of carbon, silicon, germanium, tin, lead and flerovium.

The waveguide may be formed using only CMOS compatible processes.

The waveguide may be formed using only low temperature processes such that dopant redistribution does not occur.

The refractive index of the waveguide material may be above 2 for wavelengths between 1300 nm and 1550 nm.

The method of fabrication may comprise only CMOS compatible processes.

The method of fabrication may comprise only low temperature processes such that dopant redistribution, for example in an active crystallise silicon photonic layer, does not occur.

Forming the waveguide by a layer of deposited group IV semiconductor material may comprise depositing cladding on a substrate; forming a slope in the cladding; and depositing a layer of group IV semiconductor material on the slope of the cladding to form the waveguide.

The method of fabrication of the slope waveguide may be performed at a temperature below 350° C.

The slope may be formed in the cladding using wet etching. This may help ensure the device is kept at a low temperature during slope formation, so as to avoid dopant redistribution in the device.

Forming the waveguide on the slope of the cladding may comprise depositing the waveguide material on the sloped cladding by hot wire chemical vapour deposition, HWCVD. Again, this slope waveguide formation process helps to ensure the device is kept at a low temperature, so as to avoid dopant redistribution in the device.

At least one deposition process may be performed using plasma enhanced chemical vapour deposition, PECVD.

The cladding may be deposited on the substrate using plasma enhanced chemical vapour deposition, PECVD.

Depositing a layer of group IV semiconductor material on the slope of the cladding to form the waveguide may comprise depositing the waveguide material on the sloped cladding; covering a surface of the waveguide material with a photoresist; patterning the photoresist; etching the waveguide material; and removing the photoresist.

Patterning the photoresist may be performed by e-beam lithography.

Patterning the photoresist may be comprised of patterning the waveguide structure on the photoresist to define the waveguide and a grating coupler structure.

Forming a slope on cladding may comprise covering a surface of the cladding with a photoresist; partially removing the photoresist; wet etching the cladding and photoresist to form an angled slope profile; and removing the photoresist.

Partially removing the photoresist may comprise exposing parts of the photoresist under UV light using a patterned mask and developing the photoresist.

Partially removing the photoresist may further comprise pre baking the photoresist before exposing parts of the photoresist and/or post baking the photoresist after exposing parts of the photoresist.

The angle of the slope waveguide may be based on the time and temperature of the pre baking and/or the post baking of the photoresist.

The angle of the slope waveguide may be based on the wet etching of the cladding into an angled slope profile.

Wet etching of the cladding and photoresist may comprise determining a fluid for use as a wet etchant and a duration of wet etching based on the cladding material, photoresist material and the required slope angle.

The first photonic layer may be crystalline silicon and the second photonic layer may be amorphous silicon.

The first and second photonic layers may be optically connected by the waveguide.

A first integrated photonic component and a second integrated photonic component may be optically connected by the waveguide.

BRIEF DESCRIPTION OF THE DRAWINGS

Embodiments of the invention are further described hereinafter with reference to the accompanying drawings, in which:

FIGS. 3A, 3B, 4A and 4B provide example illustrations of a waveguide in accordance with the present disclosure;

FIG. 5 is a flowchart of an example method of fabrication of a slope waveguide in accordance with the present disclosure;

DETAILED DESCRIPTION

The present disclosure describes an integrated photonic device comprising a slope waveguide formed by a deposited layer of group IV semiconductor material which enables efficient transmission between components or waveguide circuitry, for example, located at different heights, levels or layers within the photonics device, without consuming large amounts of space.

Figure 1A:
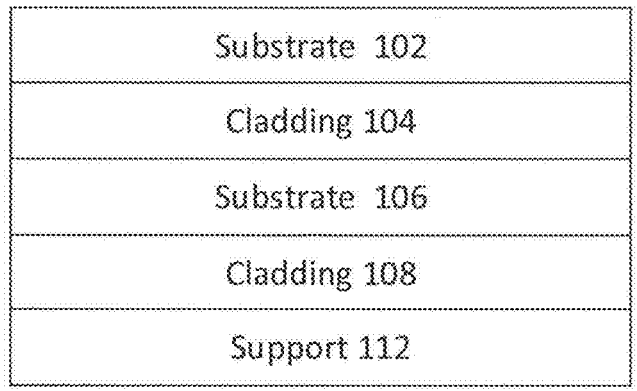
FIG. 1A provides an illustration of a cross section through an integrated photonic device according to an example of the present disclosure.

FIG. 1A provides an illustration of a cross section through a three-dimensional integrated photonic device 100 according to an example of the present disclosure. The integrated photonic device 100 is generally planar in shape, extending in the two-dimensional plane perpendicular to the cross section. As will be described below, in the example, the device 100 is formed in a Silicon On Insulator wafer architecture. However, the coupling waveguides of the present disclosure can be implemented in 'three-dimensional' integrated photonic devices comprising different semiconductor wafer architectures and material layers to couple photonic components arranged at substantially different heights in the device with respect to the plane of the wafer architecture.

In the example shown in FIG. 1A, the integrated photonic device 100 comprises a plurality of layers, arranged facing each other. The 'layers' in the device are generally arranged at the same height across at least part of the surface of the wafer, formed by a material deposition or growth process. The material properties or microscale topology of the layers may be altered locally or in bulk by some microfabrication process such as doping or ion implantation, etching, deposition of various materials, and photolithographic patterning, for example, in order to form one or more photonic or electronic features, or components therein.

In the example embodiment shown in FIG. 1A, the layers of the integrated photonic device 100 comprise a silicon substrate or 'handle' 112, an electrically insulating Buried Oxide 'BOX' layer, and two photonic 'device' layers 102, 106 separated by cladding 104. Although not shown, a Top Oxide 'TOX' cladding layer may also be formed on top of the uppermost device layer 102. As will be explained in more detail below, the cladding layers 104, 108 (BOX and TOX) serve to optically isolate the device layers 102, 106.

In general, the photonic device 100 includes at least one integrated photonic component supported by the substrate 112. The photonic device 100 will typically include a large number of photonic components to generate, manipulate, guide or sense light arranged in one or more photonic circuits formed substantially in or across the one or more device layers of the photonic device. Generally, the photonic components are formed in the deposited device layers 102, 106. However, the processing of the wafer to fabricate one or more of the photonic or electronic components may result in this monolithic 'layer' architecture being not readily apparent in the device 100. For example, the layers may comprise sub layers of different material properties, and have different thicknesses and heights, arranged alongside other, different layers of material.

In the example embodiment shown in FIG. 1A, there is a simple case of an integrated three-dimensional photonic device 100 formed from at least one integrated photonic component in each device layer 102, 106. The respective optically isolating cladding layers 104, 108 faces the integrated photonic components in the substrate layers 102, 106 optically isolates them so that light does not pass through the cladding and interfere with the photonic components in the other device layer. In the integrated photonic device 100, the device layers 102, 106 may comprise integrated photonic components arranged in an integrated photonic circuit that combine to perform a task, for example modulation/demodulation.

In more detail, in an SOI wafer architecture, the 'handle' substrate layer 112 is typically formed of a relatively thick layer of silicon (200-1000 µm thick) serving as a support for the active wafer components above and providing a base on which to begin device fabrication. The BOX layer 108 is typically formed of a relatively thin layer of silica $SiO_2$ (0.1-20 µm thick), serving to isolate the device layer 106 from the handle layer 112.

The or each device layer 102, 106 may be formed of a typically thin layer of silicon or one of its compounds such as silicon nitride or silicon germanium (typically 150-700 nm thick) which can be etched, and patterned and doped to form one or more photonic active or passive integrated photonic components in one or more optical circuits in the or each device layer 102, 106, which may also include one or more integrated electronic components to form a hybrid device.

A cladding layer, 104, provided as a Top Oxide 'TOX' layer of silica is formed on top of the device layer 106 to protect and optically isolate the photonic components formed therein from the device layer 102. Although not shown, a Top Oxide 'TOX' cladding layer may also be formed on top of the uppermost device layer 102. Thus the BOX layer 108 and the cladding layer(s) 104 can be similarly formed of silica material. The cladding may be any material that cooperates with the substrate layers 102, 106 to optically isolate them. In one example, the cladding is an oxide. For example, the cladding is silicon dioxide.

The architecture provides a platform which can be processed to form a three dimensional integrated photonic device. The material of the device layers (in the example, silicon) is typically transparent to infrared light above 1.1 µm and can therefore transmit light, for example, at 1300 nm or 1550 nm, emitted by laser diodes and VCSELs, for communications and networking applications with very low losses below around 0.5 dB/cm. Further, the material of the device layers (in the example, silicon) has a relatively high refractive index (for silicon this is around 3.5), whereas the material of the cladding layers (in the example, silica) has a relatively low refractive index (for silica this is around 1.44). Thus, this high index contrast between the device and the surrounding cladding layers ensures that light generated or coupled into the device layers can be contained within the layers as it undergoes total internal reflection at the material interface. The device layer itself therefore forms a one-dimensional planar waveguide, restricting the passage of light within the plane. To guide and manipulate the light within the device layers 102, 106, the device layer material 102, 106 can be etched to form a strip or rib of device layer material configured as a two-dimensional channel waveguide to constrain the movement guide the light along the remaining unetched silicon device layer material.

However, in accordance with the present disclosure, a waveguide may be formed in the cladding 104 facing the device layers to allow light to pass between two components in device layer 102 or between two components in device layer 106. In another example, a waveguide may be formed in the cladding 104 between the device layers to allow light to pass from a component in device layer 102 to a component in device layer 106 or to a component in device layer 102 from a component in device layer 106.

The material of each device layer (or at least the basis for the photonic components formed therein) may be in crystalline form (having a substantially single, uniform crystal lattice structure), polycrystalline form or in amorphous form. In a multilayer SOI wafer architecture such as that shown in FIG. 1A, the device layer 106 may be a monocrystalline Silicon c-Si layer and the device layer 102 may be an amorphous Silicon a-Si layer (which may be hydrogenated). Compared to the a-Si, the c-Si device layer 106 has a greater electronic performance, and so is used to form more active electronic and photonic components and enable this provides the basis for complex photonic circuit design and hybrid photonic-electronic device integration. This arrangement is advantageous as the fabrication of the photonic components in the c-Si device layer 106 allows integration with microelectronics formed in front-end-of-line (FEOL) semiconductor processing, occurring at elevated temperatures (above 350 degrees Celsius). However, the a-Si layer allows integration photonic components in multiple layers with microelectronic components formed in back-end-of-line (BEOL) CMOS semiconductor processing, where these components would degrade in the high temperatures of the FEOL processes. Thus, the slope couplers of the present disclosure provide a means by which optical circuit fabrication can be integrated across FEOL and BEOL semiconductor processing.

In other embodiments, for example not having a SOI architecture, the substrate may be provided by a Si layer in which one or more photonic components may be formed. In other embodiments, one or more of the Buried Oxide and cladding layers 104, 108 may be omitted, and further layers of deposited or grown material may be provided. For example, only a single device layer may be provided, or more than two device layers may be provided. Further, one or more of the material layers of the device 100 may not be formed along a substantially uniform height or location, and the layers may not be of uniform thickness along their length. This variation in height, location and thickness may have come about from processing of one or more of the layers by, for example, etching, photolithography, selective deposition and material growth. Thus, the layers may not be formed on a flat surface and are not flat themselves but rather substrates may differ in thickness and shape. In another example, components formed within the device are not limited to being within precise layers but rather the components may comprise multiple layers or sublayers of differently processed material to have different structure or material properties compared to surrounding material and layers. Although FIG. 1A illustrates specific planes of each material, any number, thickness and combination of each material may be formed at any plane within the three-dimensional integrated photonic device. For example, any number of device layers could be used to form the integrated photonic device 100.

As will described below in relation to FIGS. 1B and 2, in accordance with the present disclosure, a slope coupler is formed in the photonic device in one or more layers of the photonic device to guide light through the device in a height direction, for example to optically couple components in two different photonic device layers or photonic components arranged at substantially different heights in the photonic device. Alternatively, a slope coupler of the present disclosure may be used to couple photonic components arranged at substantially the same height in the photonic device by guiding light out of a device layer, over features formed in the device layer, and back into the device layer at another location.

Figure 1B:
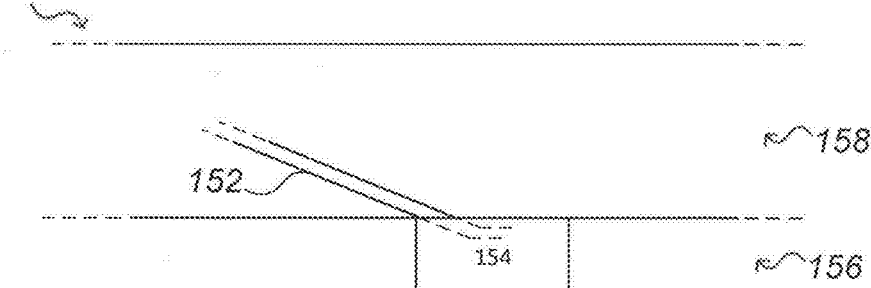
FIG. 1B provides an illustration of an integrated photonic device including a waveguide according to an example of the present disclosure.

FIG. 1B provides an example illustration of an integrated photonic device 150, a device layer 156 extending substantially in a plane of the device 150 and a waveguide 152. The integrated photonic device 150 comprises an integrated photonic component 154 formed in the device layer 156 by some CMOS compatible process such as doping or ion implantation, etching, deposition of various materials, and photolithographic patterning. Optically isolating cladding 158 faces the integrated photonic component 154. The integrated photonic device 150 also comprises a waveguide 152 formed by a deposited layer of group IV semiconductor material to extend on a slope in a direction out of the plane of the device layer 156. The waveguide 152 is arranged to, in use, couple light from/to the integrated photonic component 154 through the optically isolating cladding 158.

The group IV semiconductor material forming the waveguide may be a silicon-based photonics material. The group IV material may comprise at least one of carbon, silicon, germanium, tin, lead and flerovium. In an example, the waveguide material is amorphous silicon. In another example, the waveguide material is one of silicon nitride, polysilicon, germanium and silicon germanium alloy for effective integration with silicon photonics. The refractive index of the waveguide material may be above 2, or above 2.5, or above 2.8, or above 3 for wavelengths in the region 1.3-1.55 µm. In an example, the integrated photonic device 150 is the integrated device 100 of FIG. 1A, device layer 156 may be device layer 102 or device layer 106 of FIG. 1A and cladding 158 may be BOX layer 104 or cladding 108 of FIG. 1A. In another example, cladding 158 may not extend in a plane but may be located on a face of the integrated photonic component 154 and extend only a limited extent therearound. In an example, the thickness of the cladding is based on the maximum allowable cross talk between device layers. For example, the cladding thickness is more than 500 nm. Waveguide 152 may be dimensioned, arranged and featured to effectively couple light into or out of the integrated photonic component 154.

Figure 2:
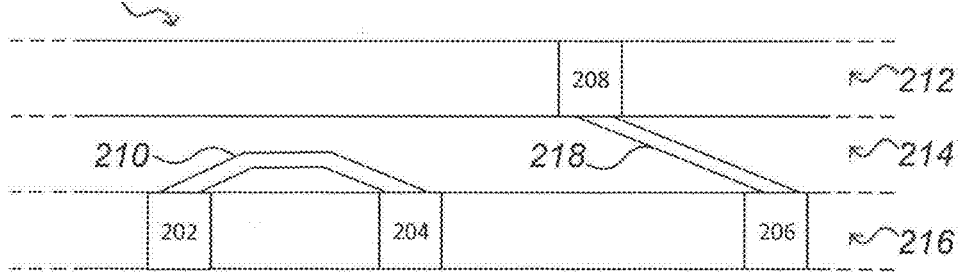
FIG. 2 provides an illustration of a cross-section through an integrated photonic device and example waveguides of the present disclosure.

FIG. 2 provides an illustration of a cross-section through an integrated photonic device 200 and example waveguides 210, 218. The photonic device 200 comprises device layers 212 and 216 and cladding 214. Photonic device 200 comprises waveguides 210 and 218 and photonic components 202, 204, 206, 208. Photonic components 202, 204 and 206 are formed in device layer 216 of photonic device 200 and photonic component 208 is formed in device layer 212 of photonic device 200. The waveguides 210, 218 enable direct coupling between components. In an example, photonic components 202, 204, 206, 208 are active photonic components. For example, one of the active photonic components may be a thermo-optic switch.

In an example, photonic component 206 is a first integrated photonic component formed in device layer 216 extending substantially in a plane of the device 200 facing optically isolating cladding 214 and component 208 is a second integrated photonic component formed in device layer 212 extending substantially in a plane of the device 200 facing the optically isolating cladding 214 such that the optically isolating cladding 214 is between the first integrated photonic component 206 and the second integrated photonic component 208. Waveguide 218 is arranged to couple light from/to the second integrated photonic component, optically linking the first integrated photonic component 206 and the second integrated photonic component 208. In an example, waveguide 218 extends through the cladding 214 on a slope in a direction into the plane of the device layer 212. In an example, the height of the waveguide 214 is equal to the thickness of the cladding 214 between device layer 212 and device layer 216.

In another example, photonic component 202 is a first integrated photonic component formed in a device layer 216 extending substantially in a plane of the device 200 facing optically isolating cladding 214 and photonic component 204 is a third integrated photonic component formed in device layer 216 extending substantially in the same plane of the device as the device layer 216 and the first integrated photonic component. The waveguide 210 is arranged to couple light from the first integrated photonic component 202 to the third integrated photonic component 204 and/or vice versa. In an example, waveguide 210 extends on a slope in a direction out of the plane of the device layer 216 and then extends on a slope in a different direction into the plane of the device layer 216. In an example, waveguide 210 extends parallel to the plane of the device layer 216 between extending out of and into the plane of the device layer 216. In an example, the waveguide 210 extends from the device layer 216 into the cladding 214 and back into the device layer 216.

In an example, integrated photonic device 200 is integrated photonic device 150 of FIG. 1B and/or integrated photonic device 100 of FIG. 1A. In an example, device layers 212 and 216 and cladding 214 are the respective device layers 102 and 106 and cladding 104 of FIG. 1A. In another example, either device layer 216 or device layer 212 is device layer 156 of FIG. 1B and cladding 214 is cladding 158 of FIG. 1B. In an example, one of photonic components 202, 204, 206, 208 is photonic component 154 of FIG. 1B.

It is to be understood that, although illustrated in FIG. 2 with a certain number and combination of waveguides, device layers and components, photonic device 200 may comprise any number or combination of waveguides 210 and 218, any number and combination of layers 212, 214, 216 and any number and combination of components 202, 204, 206, 208 in across the layers. In an example, a photonic device comprising only waveguide 210 may have only one device layer 216 and may not comprise device layer 212. In an example, one or more waveguides 210 and/or one or more waveguides 218 are placed either in parallel or crossed over each other and cladding 214 is sufficient to provide optical crosstalk isolation between waveguides.

In an example, the integrated photonic devices 100, 150 and 200 of FIGS. 1A, 1B and 2 respectively are multi-layered integrated photonic devices. In this example, in the multi-layered integrated photonic device of FIG. 1A, device layers 102 and 106 are active layers. BOX layer 104 and cladding 108 are isolation layers and substrate 112 is support or 'handle' layer. Although FIG. 1A illustrates five layers, any number and combination of each layer may be formed within a multi-layered photonic device. Each layer may be of any thickness, for example the thickness of the cladding layer may be smaller than the thickness of the active layer to maximise component density in the device. Conversely, to reduce noise from adjacent active layers, cladding layer may be thick. Also, in this example, in the multi-layered integrated photonic device of FIG. 1B, device layer 156 is an active layer and cladding 158 is a cladding isolation layer.

In this example, in the multi-layered integrated photonic device of FIG. 2, the device layer 216 extending substantially in a plane of the device that supports the first integrated photonic component 206 forms a first photonic layer comprising one or more integrated photonic components including the first integrated photonic component 206, the device layer 212 extending substantially in a plane of the device that supports the second integrated photonic component 208 forms a second photonic layer comprising one or more integrated photonic components including the second integrated photonic component 208 and the optically isolating cladding 214 is a cladding layer between the first and second photonic device layers. In an example the first and second photonic device layers are optically connected by the waveguide 218. In an example the photonic device layer 216 is crystalline silicon and the second photonic device layer 212 is amorphous silicon.

Figure 3A:
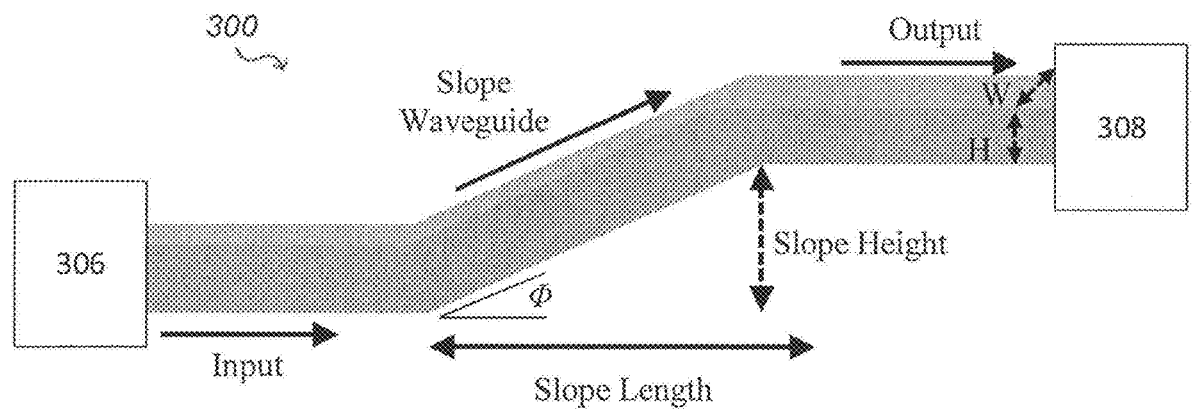
Figure 3B:
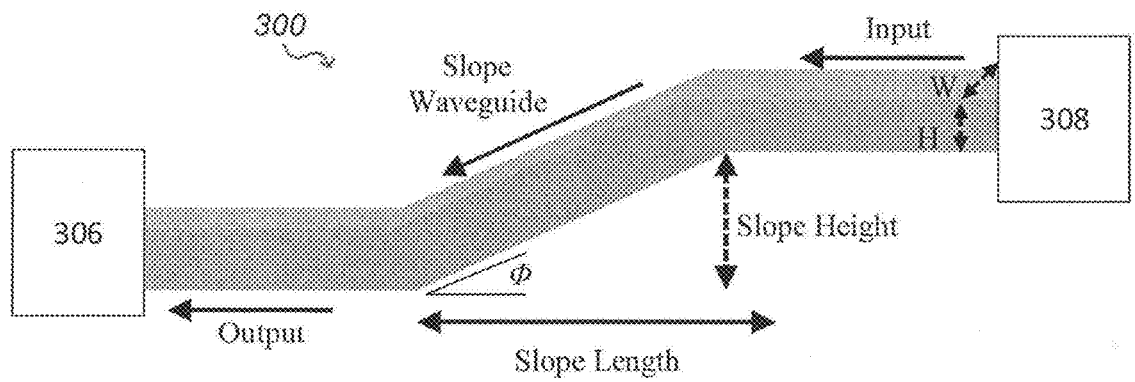

FIGS. 3A, 3B, 4A and 4B provide example illustrations of slope waveguides for coupling light from/to integrated photonic components through optically isolating cladding in accordance with the present disclosure. FIGS. 3A and 3B illustrate an example waveguide 300 in which the waveguide extends on a slope in a direction out of the plane of the substrate (e.g. in an SOI wafer architecture, the plane defined substantially by the bulk 'handle' layer). The slope waveguide 300 of FIGS. 3A and 3B is arranged to, in use, couple light from/to an integrated photonic component 306 through the optically isolating cladding. In an example, the waveguide 300 may be configured to a couple light from/to a second integrated photonic component 308 supported by a substrate extending substantially in a plane of the device facing the optically isolating cladding such that the optically isolating cladding is between the first integrated photonic component 306 and the second integrated photonic component 308. In an example, the waveguide may optically link the first integrated photonic component 306 and the second integrated photonic component 308. The arrangement of the first integrated photonic component 306 and the second integrated photonic component 308 as shown in FIGS. 3A and 3B is schematic only and not intended to be limiting, and the photonic components 306 and 308 may be arranged above or below the slope waveguide. Gratings may be formed in either end of the slope waveguide configured to couple the light between the components 206, 208 and the slope waveguide to propagate along the slope waveguide.

FIGS. 3A and 3B illustrate an example waveguide 300 optically connected to integrated photonic component 306 and integrated photonic component 308 and optically linking integrated photonic component 306 and integrated photonic component 308. FIG. 3A illustrates waveguide 300 configured such that light is coupled from integrated photonic component 306 to integrated photonic component 308. FIG. 3B illustrates waveguide 300 configured such that light is coupled from integrated photonic component 308 to integrated photonic component 306. In an example, the waveguide 300 is a slope waveguide comprise an angled slope profile. As shown in FIGS. 3A and 3B, the waveguide 300 has height H (also known as core thickness), width W, slope height, slope length and slope angle $\phi$. The slope height is the distance gained by the waveguide in the plane perpendicular to the plane of the substrate by which the integrated photonic component is supported. The slope height is adjustable by changing the etching parameters, which is described in more detail below. The slope length is the distance gained by the waveguide in the plane parallel to the plane of the substrate by which the integrated photonic component is supported. The slope angle $\phi$ is the angle of extension of the slope waveguide away from the plane of the substrate supporting the first integrated photonic component.

In an example, the slope angle is less than 35°. This enables low loss by ensuring light can be easily coupled from an integrated photonic component to the waveguide. In another example, the slope angle $\phi$ is approximately 10°. In an example, the slope height of the slope waveguide 300 is between 1 µm and 2 µm. In another example, the slope height of the slope waveguide is approximately 1.4 µm. In an example, the width of the slope waveguide 300 is between 400 nm and 1000 nm. In another example, the width of the slope waveguide 300 is approximately 600 nm. In an example, the height of the slope waveguide 300 is less than 1 µm. In another example, the height of the slope waveguide 300 is approximately 400 nm. In an example, the working wavelength of the waveguide 300 is 1550 nm. In an example, the waveguide 300 is not formed from a polymeric material. In another example, the waveguide 300 material is amorphous silicon.

In an example, the height and width of the waveguide 300 is constant throughout the slope of the waveguide 300. In another example, the height H and/or width of the waveguide 300 varies at different points along the waveguide 300. In an example, the waveguide 300 is tapered as it extends from the first integrated photonic component. In an example, at least one end of the waveguide 300 is tapered out to a grating coupler which couples light from/to integrated photonic component 306 or 308. In an example, the photonic device further comprises a resonant structure between integrated photonic component 306 or 308 and the waveguide 300.

An example structure of a small and efficient waveguide is a waveguide fabricated on a slope angle of 10.3°, height of 1.5 µm and length of 6.95 µm. An amorphous silicon optical slope waveguides with such dimensions can achieve a transmission loss of 0.27 dB/slope at 1550 nm wavelength.

In an example, waveguide 300 is waveguide 152 of FIG. 1B and/or waveguide 218 of FIG. 2. In an example, integrated photonic component 306 or integrated photonic component 308 is integrated photonic component 154 of FIG. 1B. In another example, integrated photonic component 306 is integrated photonic component 206 and integrated photonic component 308 is integrated photonic component 208.

FIG. 4A illustrates another example waveguide in which the waveguide 400 extends on a slope in a direction out of the plane of the substrate and in a direction into the plane of the substrate. The waveguide 400 of FIG. 4A is arranged to, in use, couple light from/to a first integrated photonic component 402 through the optically isolating cladding from/to a third integrated photonic component 404 supported by a substrate extending substantially in the same plane of the device as the substrate supporting the first integrated photonic component. Waveguide 400 is connected to integrated photonic component 404 and integrated photonic component 402. One side of the waveguide 400 has height H, width W and slope angle ϕ. The opposite side of the waveguide may have the same height, width and slope angle. Alternatively, the opposite side of the waveguide may differ in height, width and slope angle to enable connection to an integrated photonic component in another layer that is parallel to the plane of the layer of the integrated photonic component of the first side or that is at an angle to the plane of the layer of the integrated photonic component of the first side.

In an example, the waveguide may be formed from two slope waveguides. In an example, the waveguide may be formed from one or more waveguide 300 of FIGS. 3A and 3B, waveguide 152 of FIG. 1B and waveguide 210 of FIG. 2. In an example, integrated photonic component 402 is integrated photonic component 202 and integrated photonic component 404 is integrated photonic component 204.

FIG. 4B illustrates another example waveguide in which the waveguide 450 extends on a slope in a direction out of the plane of the substrate. The waveguide 450 is arranged to, in use, couple light from/to an integrated photonic component 404 through the optically isolating cladding. Waveguide 400 is connected to integrated photonic component 404. The structure of this waveguide enables light to be guided from one layer to another layer through large-dimensions of input structure (for example, core height=2 μm and width=5 μm) for the ease of measurement in butt-coupling and direct coupling of high power optical input to different layers. In an example, waveguide 450 is waveguide 152 of FIG. 1B and/or waveguide 218 of FIG. 2 and/or waveguide 300 of FIGS. 3A and 3B.

In an example, integrated photonic component 404 is integrated photonic component 154 of FIG. 1B. In an example, Integrated photonic component 404 is integrated photonic component 202, 204, 206 or 208 of FIG. 2 or integrated photonic component 306 or 308 of FIG. 3A or 3B.

FIG. 5 is an example flowchart of a method 500 of fabrication of a slope waveguide within an integrated photonic device, the integrated photonic device comprising a first integrated photonic component supported by a substrate extending substantially in a plane of the device, the waveguide arranged to, in use, couple light from/to the first integrated photonic component through optically isolating cladding. The method 500 of FIG. 5 comprises forming 502 the waveguide by a layer of deposited group IV semiconductor material to extend on a slope in a direction out of the plane of the substrate.

In an example, the waveguide fabricated may be the waveguide of any of FIGS. 1B, 2, 3A, 3B, 4A and 4B. In an example, the method 500 of fabrication comprises only CMOS compatible processes. In another example, the method of fabrication comprises only low temperature processes. The method of fabrication of the waveguide of any of FIGS. 1B, 2, 3A, 3B, 4A and 4B is specific to the group IV semiconductor materials due to their high index and the precision in fabrication which they require. In an example, the processes used to form the slope waveguide may be, or require, relatively low temperature Back End of Line processes in order not to damage any previously-formed active electronic photonic components formed in a crystalline silicon layer in Front End of Line processes, and to avoid dopant redistribution in other layers. For example, the method 500 may be performed at a temperature below 350° C. At temperature below 350° C., the method is designed to be compatible with CMOS front and back end of line thermal requirement. Low temperature process which may be used in the slope waveguide coupler formation process include plasma enhanced chemical vapour deposition (PECVD), hot wire chemical vapour deposition (HWCVD) and wet etching.

Figure 6:
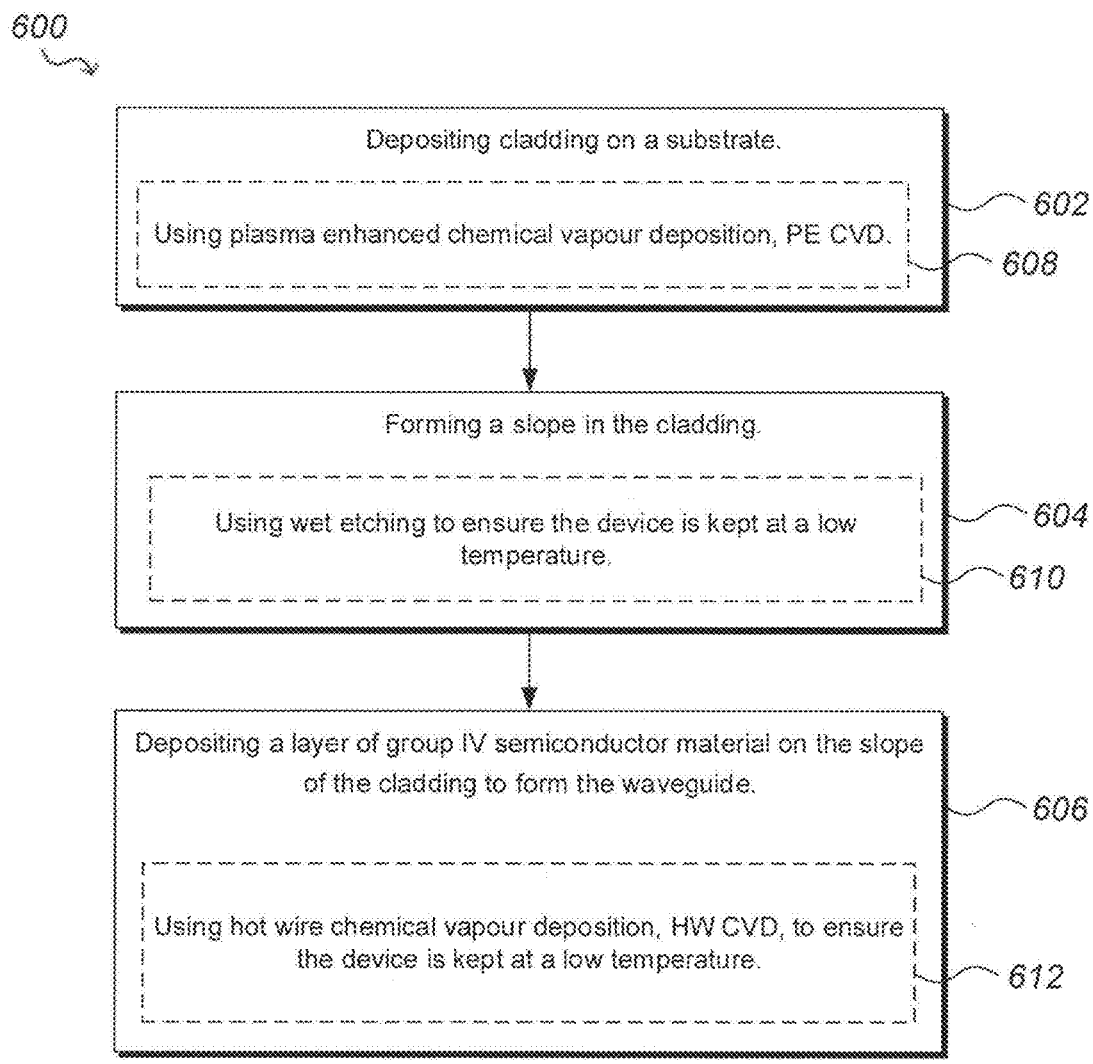
FIG. 6 is another flowchart of an example method of fabrication of a slope waveguide in accordance with the present disclosure.

FIG. 6 is an example flowchart of a detailed method 600 of fabrication of a slope waveguide. The method 600 is an example of method 500 of FIG. 5. In FIG. 6, the method 600 of forming the waveguide by a layer of deposited group IV semiconductor material to extend on a slope in a direction out of the plane of the substrate comprises depositing 602 cladding on a substrate (such as on top of a device layer in which a photonic component is formed), forming 604 a slope in the cladding and depositing 606 a layer of group IV semiconductor material on the slope of the cladding to form the waveguide. The method 600 also comprises optional features in dashed lines. In an example, cladding may be deposited 602 on a substrate using plasma enhanced chemical vapour deposition (PECVD) 608. The cladding may be an oxide, for example silicon dioxide, that is deposited using PECVD. This oxide is used to obtain the etching profile wherein different types of oxide results in different etching profiles.

Figure 8:
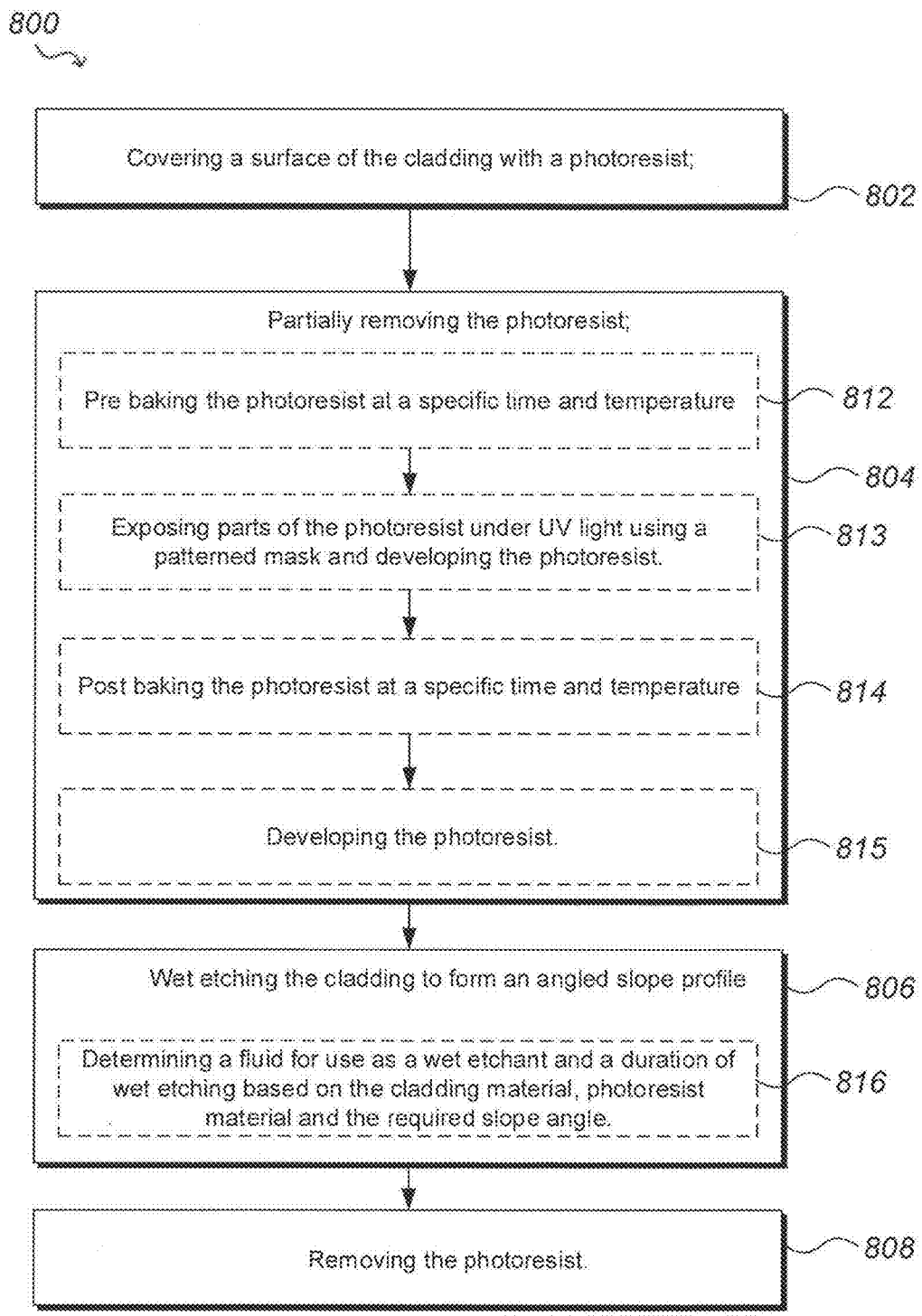
FIG. 8 is another flowchart of an example method of fabrication of a slope waveguide in accordance with the present disclosure.

In an example, in FIG. 6, the slope may be formed 604 in the cladding using wet etching, which allows the slope to be formed when the device is kept at a relatively low temperature 610 (under 350° C.). FIG. 8 illustrates an example method for the step of forming 604 a slope in the cladding of FIG. 6. The method 800 comprises covering 802 a surface of the cladding with a photoresist, partially removing 804 the photoresist, wet etching 806 the cladding to form an angled slope profile and removing 808 the photoresist. In an example, the angle of the slope waveguide is based on the wet etching of the cladding into an angled slope waveguide.

The method 800 also comprises optional features in dashed lines. In an example, covering 802 a surface of the cladding with a photoresist may comprise spin coating the photoresist onto the cladding. In an example, partially removing 804 the photoresist may comprise exposing 813 parts of the photoresist, for example, under ultraviolet (UV) light using a patterned mask and developing 815 the photoresist. In another example, the exposing of the photoresist may be under deep ultraviolet (DUV) light. In an example, partially removing 804 the photoresist further comprises pre baking 812 the photoresist and/or post baking 814 the photoresist. The pre baking 812 of the photoresist may be before exposing 813 parts of the photoresist. The post baking 814 of the photoresist may be after exposing 813 parts of the photoresist. The post baking 814 of the photoresist may be before developing 815 the photoresist.

The photoresist may be pre baked 812 and/or post baked 814 at a specific time and temperature. The angle of the slope waveguide can be controlled by altering the time and temperature of the pre baking 812 and/or post baking 814 of the photoresist. In an example, the photoresist may be hard baked after being developed 815 (not shown). The slope of the waveguide may depend on the temperature and time taken to hard bake the photoresist. In an example, wet etching 806 the cladding to form an angled slope profile may comprise determining a fluid for use as a wet etchant and a duration of wet etching based on the cladding material, photoresist material and the required slope angle.

Figure 7:
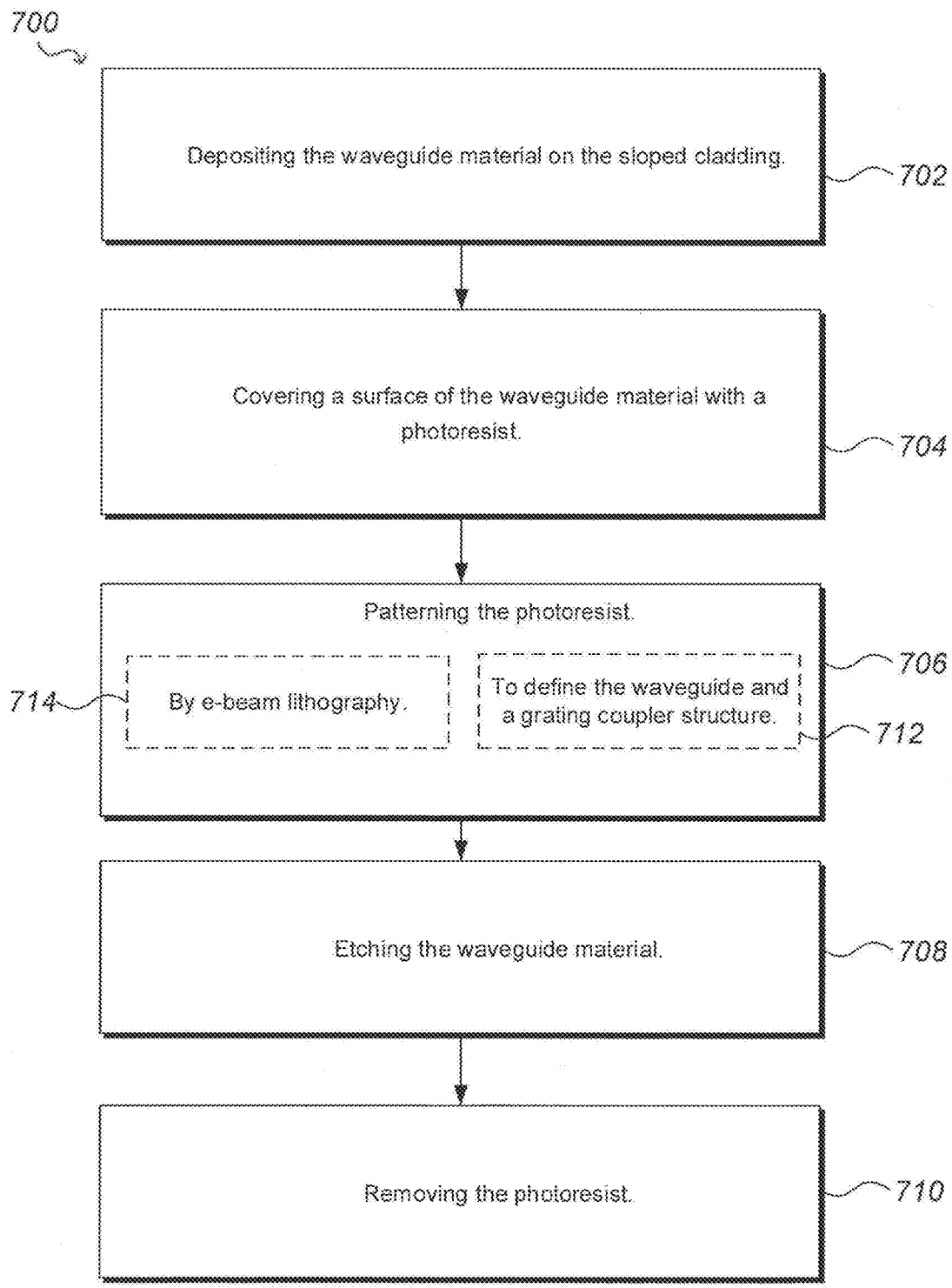
FIG. 7 is another flowchart of an example method of fabrication of a slope waveguide in accordance with the present disclosure.

In an example, in FIG. 6, the layer of group IV semiconductor material may be deposited 606 on the slope of the cladding by hot wire chemical vapour deposition (HW-CVD), which allows the deposition to be performed at a relatively low temperature 612 (under 350° C.). For example, a layer of amorphous silicon may be deposited on the sloped of the PECVD silicon dioxide cladding layer. FIG. 7 illustrates an example method for the step of FIG. 6 of depositing 606 a layer of group IV semiconductor material on the slope of the cladding to form the waveguide. The method 700 comprises depositing 702 the waveguide material on the sloped cladding, covering 704 a surface of the waveguide material with a photoresist, patterning 706 the photoresist, etching 708 the waveguide material and removing 710 the photoresist. The method 700 also comprises optional features in dashed lines. In an example, patterning 706 the photoresist may be performed using e-beam lithography 714 and/or may be performed by patterning the waveguide structure on the photoresist to define the waveguide and a grating coupler structure 712 for coupling light into/out of the slope waveguide from the photonic components. In an example, in the method of fabrication of the slope waveguide of any of FIGS. 5 to 8, at least one deposition process is performed using PECVD and/or at least one wet etching process is buffered hydrofluoric acid (BHF) wet etching.

The method steps of FIG. 6 of forming 604 a slope in the cladding and depositing 606 a layer of group IV semiconductor material on the slope of the cladding to form the waveguide may both include depositing a photoresist, patterning the photoresist, etching the device material and removing the photoresist. FIGS. 7 and 8 provided exemplary steps for the method steps of forming 604 a slope in the cladding and depositing 606 a layer of group IV semiconductor material on the slope of the cladding to form the waveguide. Thus, the method 700 of FIG. 7 may include any of the steps of method 800 of FIG. 8 and the method 800 of FIG. 8 may include any of the steps of method 700 of FIG. 7.

The steps of method 700 of FIG. 7 and of method 800 of FIG. 8 may depend on the type of photoresist used. These steps may therefore be modified depending on the type of photoresist used. For example, some photoresists will not require certain method steps and some photoresists will require extra method steps. For example, some photoresists do not require pre baking 812. In another example, the photoresist may be a positive photoresist or a negative photoresist, which may alter the type of etching and etchant being used. In an example, the photoresist may be a chemically amplified resist and may require post baking. For a chemically amplified resist, the exposure may be under DUV light. In another example, the photoresist may be a crosslinking negative resist. In another example, the photoresist may be a DNQ-novolac photoresist. The use of pre baking, post baking and hard baking and the time and temperature used for each may be based on the type of photoresist used. Moreover, pre baking, post baking and hard baking may each modify the properties of the photoresist and may therefore alter the shape of the cladding and/or waveguide material.

The angle of the waveguide is chosen to reduce the size of the waveguide whilst ensuring low loss. To vary the angle of the slope of the waveguide, when depositing 602 the cladding on a substrate, a different type of oxide can be used, as different types of oxides result in different etching profiles. Moreover, when forming 604 a slope in the cladding, after covering 802 the cladding with a photoresist, the material of the photoresist and the time and temperature of the pre baking 812 and/or post baking 814 of the photoresist can be adjusted to adjust the angle of the slope waveguide. Finally, after partially removing 804 the photoresist, when wet etching 806 the cladding, the etching duration and fluid used to wet etch can be adjusted to adjust the angle of the slope waveguide. Thus, the method as claimed in any of FIGS. 5 to 8 can enable a waveguide to be fabricated with a precise and optimum angle. Thus, a waveguide having a controllable angled slope profile can be obtained. As the slope length and slope height are based on the slope angle, these features can also be controlled.

Figure 9:
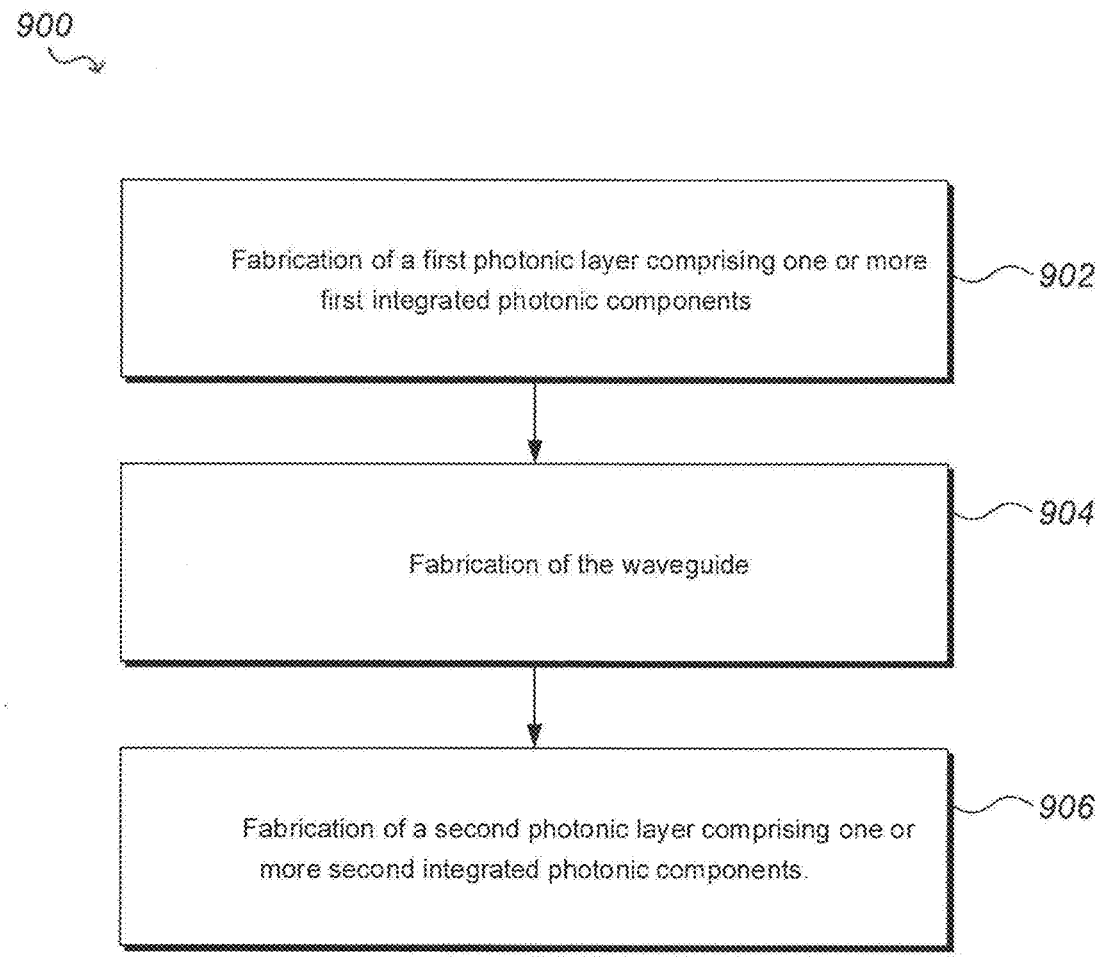
FIG. 9 is a flowchart of an example method of fabrication of a layered silicon integrated photonic device in accordance with the present disclosure.

FIG. 9 is an example flowchart of a method 900 of fabrication of a layered silicon integrated photonic device. The method 900 comprises fabrication 902 of a first photonic device layer comprising one or more first integrated photonic components, after the fabrication 902 of the first photonic layer, fabrication 904 of the waveguide as described in any of FIGS. 1B, 2, 3A, 3B, 4A and 4B and, after the fabrication 904 of the waveguide, fabrication 906 of a second photonic device layer comprising one or more second integrated photonic components. In an example, the fabrication 904 of the waveguide is method 500 of fabrication of FIG. 5 and/or method 600 of fabrication of FIG. 6. In an example, the first photonic device layer is crystalline silicon, the cladding is silica, the second photonic device layer is amorphous silicon and the waveguide is amorphous silicon. In an example, an optical component of the first photonic device layer and an optical component of the second photonic device layer are optically connected by the waveguide. In an example, layered silicon integrated photonic device is device 100 of FIG. 1A, device 150 of FIG. 1B and/or device 200 of FIG. 2. The method 900 of FIG. 9 may comprise any of the method steps of FIGS. 5 to 8 in order to fabricate the layered silicon integrated photonic device.

It should be readily apparent that the methods 500, 600, 700, 800 and 900 represent generalized illustrations and that other elements may be added or existing elements removed, modified or rearranged without departing from the scopes of the methods.

Figure 10:
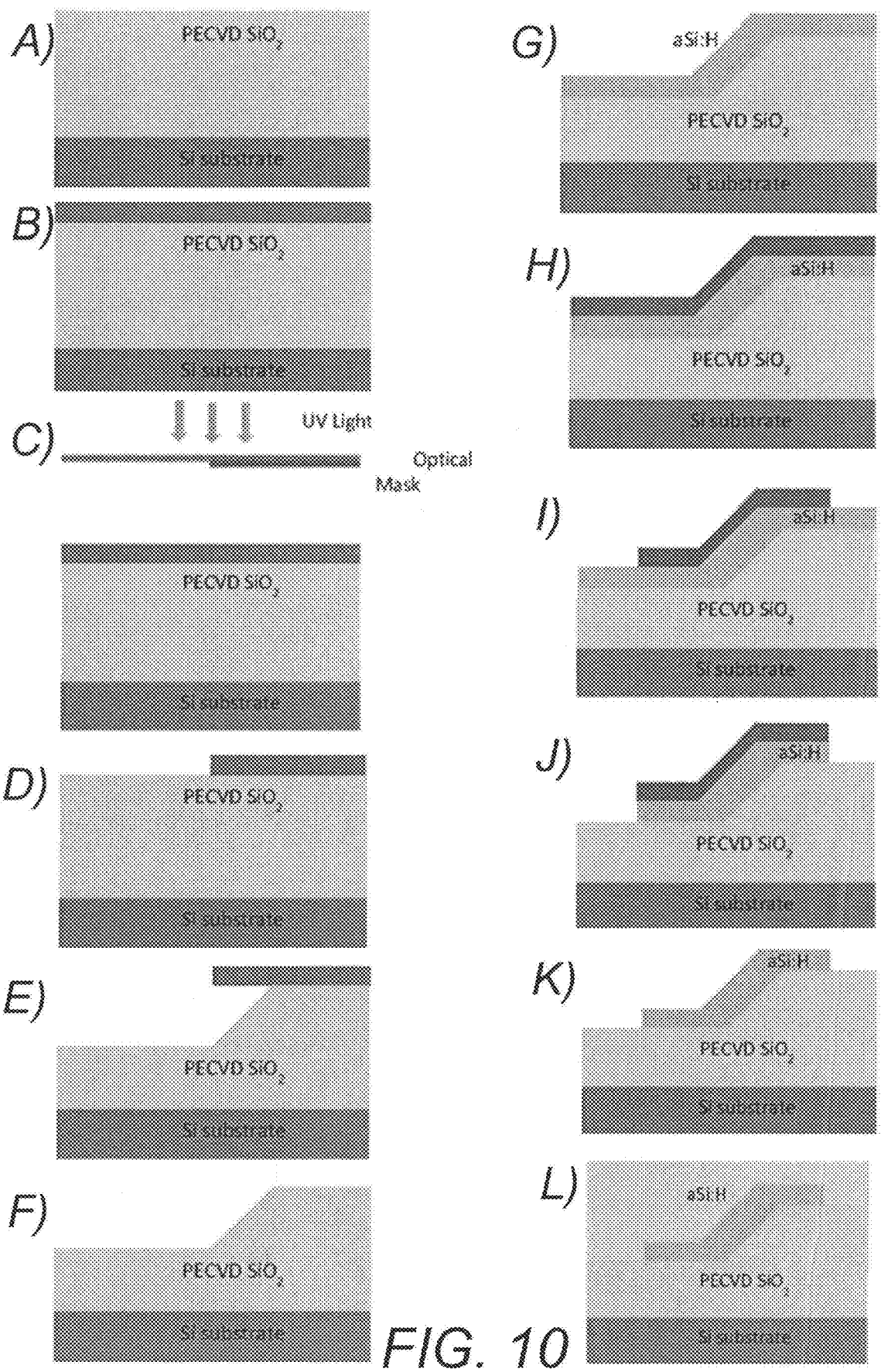
FIG. 10 provides an example integrated photonic device at different stages in an example method of fabrication in accordance with the present disclosure.

FIG. 10 provides an example integrated photonic device at different stages in a method of fabrication. The method of fabrication of FIG. 10 is to form the slope profile of the waveguide in a plasma enhanced chemical vapour deposited silicon dioxide (PECVD SiO2) layer (of e.g. cladding) deposited on a silicon substrate. As shown in FIG. 10A, 4 μm PECVD SiO2 is deposited on a silicon wafer (Si substrate). Then, the photoresist S1813 is spun on the PECVD SiO2 at 6000 rpm for 30 seconds, as shown in FIG. 10B. The sample is then baked for 90 seconds at 115° C. FIG. 10C illustrates the etch pattern being defined through an optical mask by exposing the photoresist under UV light. The sample is the developed in developer MF 319 for 35 seconds to remove the photoresist, the result of this is shown in FIG. 10D. Although the photoresist illustrated is a positive photoresist, the photoresist may instead be a negative photoresist. The slope angle of the SiO2 can be adjusted by post baking the photoresist.

The sample is then wet-etched in wet etchant to obtain the SiO2 slope profile, as shown in FIG. 10E. For example, wet etching using buffered hydrofluoric acid NH4F:HF (7:1) at room temperature for 5 minutes produced a slope angle of approximately 10.3° and a slope length of approximately 6.95 μm. The photoresist, S1813, is stripped off using plasma asher for 10 minutes, to produce the sample of FIG. 10F. Further, the sample is cleaned in acetone and Isopropyl Alcohol (IPA). 400 nm thick a-Si:H is deposited in hot wire chemical vapour deposition (HWCVD) at 230° C. substrate temperature to produce the sample as shown in FIG. 10G. Silane gas with 40 sccm and hydrogen gas with 30 sccm may be used for the deposition process. Resist ZEP520A is spun at 3370 rpm for 180 seconds, resulting in the sample shown in FIG. 10H. The sample is baked at 180° C. for 180 seconds.

The waveguide structure is patterned in e-beam lithography. For example, the waveguide may be a submicron sized strip waveguide patterned with grating couplers at either end to enable coupling of light into/out of the slope waveguide. The resist ZEP520A is developed in developer ZEDN50 for 2 minutes and 15 seconds and IPA to produce the sample of FIG. 10I. The a-Si:H is then dry etched in an RIE tool with fluorine-based gas to form the waveguide and grating coupler structure, as shown in FIG. 10J. The remaining ZEP520A is stripped off in NMP for 10 minutes and rinsed off with DI water, resulting in the sample shown in FIG. 10K. The slope waveguide is then coated using 1 μm thick SiO2 cladding to produce the integrated device shown in FIG. 10L.

Figure 11:
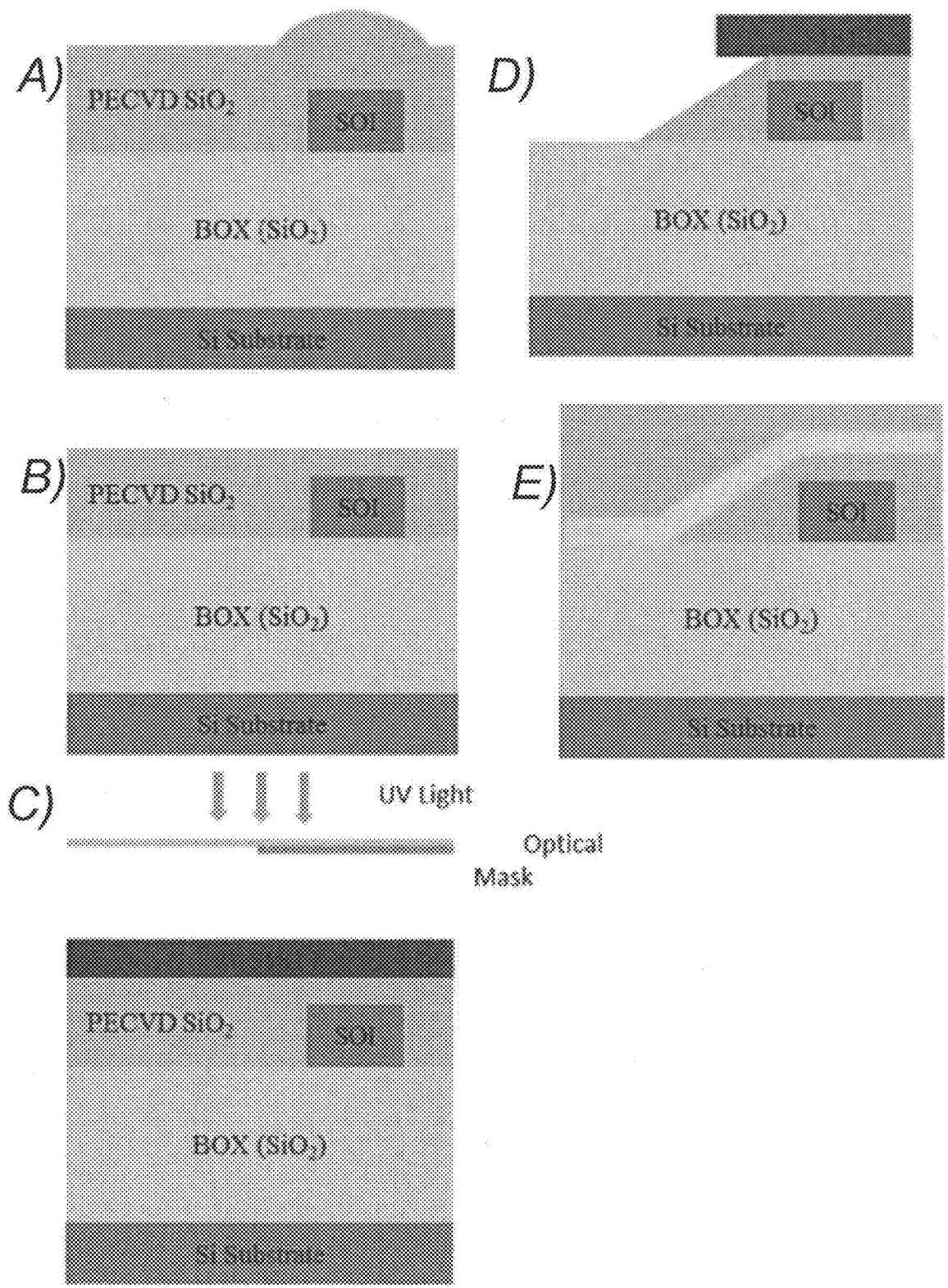
FIG. 11 provides another integrated photonic device at different stages in an example method of fabrication in accordance with the present disclosure.

FIG. 11 provides an example integrated photonic device at different stages in a method of fabrication. The method of fabrication of FIG. 11 is to form the slope profile of the waveguide fabrication in a PECVD SiO2 layer (of e g. TOX cladding) deposited on a silicon-on-insulator a (SOI) wafer. The method begins in FIG. 11A with the fabrication of and SOI waveguide by etching of the SOI silicon wafer. This forms the SOI waveguide on top of the 2 μm or 3 μm thick buried thermal silicon dioxide (BOX) layer. This is followed by deposition of a silicon dioxide layer (as a TOX layer) using PECVD method on top of the SOI waveguide. The resultant sample is illustrated in FIG. 11A. The deposited silicon oxide on the SOI waveguide creates a protuberance on the surface. A chemical mechanical polishing (CMP) process is used to planarize the silicon dioxide surface.

This planarized surface can be seen in FIG. 11B. After the silicon dioxide planarization, the etch pattern is defined through an optical mask by exposing the photoresist under UV light, as illustrated in FIG. 11C. The sample is developed in developer MF 319 for 35 seconds. The slope angle of the PECVD SiO2 can be adjusted by pre baking and/or post baking the photoresist. The sample is wet etched in wet etchant NH4F:HF (7:1) at room temperature for 5 minutes to obtain the SiO2 slope profile as illustrated in FIG. 11D.

The a-Si:H waveguide is then fabricated using hot-wire chemical vapour deposition (HWCVD), e-beam lithography pattern transfer, dry etching of a-Si:H and final capping layer of PECVD SiO2 to produce the sample shown in FIG. 11E. The dry etching may be inductively coupled plasma (ICP dry etching).

FIGS. 10 and 11 are specific examples of methods of fabrications and it should be readily apparent that, while specific variables such as materials, fluids, temperatures and times have been disclosed, these are not required to fabricate the waveguide and may be replaced with any variable that is able to fabricate the waveguide without departing from the scope of the methods recited in these figures. For example, SiO2 may be replaced with any oxide that can be used to isolate substrates.

In summary, there is provided an integrated photonic device 150 comprising at least a first integrated photonic component 154 supported by a substrate 156 extending substantially in a plane of the device and optically isolating cladding 158 facing the first integrated photonic component 154, the photonic device 150 further comprising a waveguide 152 formed by a deposited layer of group IV semiconductor material to extend on a slope in a direction out of the plane of the substrate 156, the waveguide 152 arranged to, in use, couple light from/to the integrated photonic component 156 through the optically isolating cladding 158.

To optimise the slope waveguide characteristics, such as slope angle, suitable modelling can be used to simulate the transmission characteristics of the slope waveguides while varying different slope fabrication parameters. A suitable modelling technique is Finite-difference time-domain (FDTD) modelling using software available, for example, from Lumerncal Inc., of Suite 1700, 1095 W. Pender St., Vancouver, BC V6E 2M6 Canada.

Using this modelling software, for an SOI wafer, a slope waveguide made in accordance with the method described above in relation to FIG. 11 was modelled having a height of 400 nm and with a width of the waveguides being varied from 400 nm to 1000 nm, with both ends tapered out to grating couplers. Modelling was completed, varying the step height and slope angle, to find an optimum design. According to the simulation results, a minimum cladding thickness of 500 nm is sufficient to provide optical crosstalk isolation between top and bottom waveguides placed either in parallel or crossed over each other. An optimised slope angle of 10 degrees was shown to have the lowest transmission loss of ~0.2 dB per slope.

To validate this experimentally, a slope waveguide was fabricated in accordance with the modelled optimum using the method described above in relation to FIG. 11, and the transmission properties of the interlayer slope waveguides were measured in dB per slope (dB/slope) through averaging of up to five slopes. A tuneable Agilent 8163B laser source was used for the measurements at the wavelength of 1550 nm in transverse electric (TE) mode polarization. Light was coupled at the input and output of the slope waveguides via grating couplers. Averaged transmission measurements of the fabricated a-Si slope waveguide having a width of 600 nm and core thickness of 400 nm at TE polarized 1550 nm wavelength revealed that normalised loss was 0.27 dB/slope. This is remarkably close to the modelled loss, but it is possible that the slight shortfall in the measured loss could have been due to the edge roughness of the etched $SiO_2$ slope, which is transferred to the deposited a-SiH. This suggests photolithography pattern transfer issue of the photoresist with sidewall roughness that can be smoothed by post-baking the resist in the future as a way to reduce the transmission loss.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. An integrated photonic device comprising:
at least a first integrated photonic component supported by a substrate extending substantially in a plane of the device and optically isolating cladding facing the first integrated photonic component, the photonic device further comprising a waveguide formed by a deposited layer of group IV semiconductor material to extend on a slope out of a plane of the substrate in a direction out of the plane of the substrate, the waveguide arranged to, in use, couple light from/to the integrated photonic component through the optically isolating cladding.

2. The photonic device as claimed in claim 1, the device further comprising a second integrated photonic component supported by a substrate extending substantially in a plane of the device facing the optically isolating cladding such that the optically isolating cladding is between the first integrated photonic component and the second integrated photonic component.

3. The photonic device as claimed in claim 2, wherein the waveguide is arranged to couple light from/to the second integrated photonic component, optically linking the first integrated photonic component and the second integrated photonic component.

4. The photonic device as claimed claim 2, further comprising a third integrated photonic component supported by a substrate extending substantially in the same plane of the device as the substrate supporting the first integrated photonic component, wherein the waveguide is arranged to couple light from/to the third integrated photonic component.

5. The photonic device as claimed in claim 1, wherein the waveguide is a sloped waveguide comprising an angled slope profile.

6. The photonic device as claimed in claim 5, wherein an angle of extension of the sloped waveguide away from the plane of the substrate supporting the first integrated photonic component is less than 35°.

7. The photonic device as claimed in claim 5, wherein an angle of extension of the sloped waveguide away from the plane of the substrate supporting the first integrated photonic component is approximately 10°.

8. The photonic device as claimed in claim 5, wherein a step height of the sloped waveguide is between 1 μm and 2 μm.

9. The photonic device as claimed in claim 5, wherein a step height of the sloped waveguide is approximately 1.4 μm.

10. The photonic device as claimed in claim 5, wherein a width of the sloped waveguide is between 400 nm and 1000 nm.

11. The photonic device as claimed in claim 5, wherein a width of the sloped waveguide is approximately 600 nm.

12. The photonic device as claimed in claim 5, wherein a height of the sloped waveguide is less than 1 μm.

13. The photonic device as claimed in claim 5, wherein a height of the sloped waveguide is approximately 400 nm.

14. The photonic device as claimed in claim 1, wherein a working wavelength of the waveguide is 1550 nm.

15. The photonic device as claimed in claim 1, wherein a thickness of the optically isolating cladding is more than 500 nm.

16. The photonic device as claimed in claim 1, wherein the semiconductor material of the waveguide is amorphous silicon.

17. The photonic device as claimed in claim 1, wherein ends of the waveguide are tapered out to grating couplers.

18. The photonic device as claimed in claim 1, wherein a height and a width of the waveguide is constant throughout the slope of the waveguide.

19. The photonic device as claimed in claim 1, wherein the waveguide is tapered as it extends from the first integrated photonic component.

20. The photonic device as claimed in claim 1, further comprising a resonant structure between the first integrated photonic component and the waveguide.

21. The photonic device as claimed in claim 1, wherein the waveguide is formed using a low temperature deposition process.

22. The photonic device as claimed in claim 2, wherein the integrated photonic device is a layered integrated photonic device and wherein the substrate extending substantially in a plane of the device that supports the first integrated photonic component forms a first photonic layer comprising one or more integrated photonic components including the first integrated photonic component, the substrate extending substantially in a plane of the device that supports a second integrated photonic component forms a second photonic layer comprising one or more integrated photonic components including a second integrated photonic component and the optically isolating cladding is a cladding layer between the first and second photonic layers.

23. The photonic device as claimed in claim 21, wherein the first and second photonic layers are optically connected by the waveguide.

24. The photonic device as claimed in claim 21, wherein the first photonic layer is fabricated, the waveguide is fabricated after the first photonic layer is fabricated and the second photonic layer is fabricated after the waveguide is fabricated.

25. The photonic device as claimed in claim 21, wherein the first photonic layer is crystalline silicon and the second photonic layer is amorphous silicon.

26. The photonic device as claimed in claim 1, wherein the group IV material is a silicon-based photonics material.

27. The photonic device as claimed in claim 1, wherein the group IV material comprises at least one of carbon, silicon, germanium, tin and lead.

28. The photonic device as claimed in claim 1, wherein a refractive index of the waveguide material is above 2 for wavelengths between 1300 nm and 1550 nm.

* * * * *

UNITED STATES PATENT AND TRADEMARK OFFICE
CERTIFICATE OF CORRECTION

PATENT NO. : 10,571,629 B1
APPLICATION NO. : 15/999071
DATED : February 25, 2020
INVENTOR(S) : Harold Chong et al.

It is certified that error appears in the above-identified patent and that said Letters Patent is hereby corrected as shown below:

In the Specification

Column 14, Line 2, delete "38" and insert -- 3B --.

Column 14, Line 8, delete "38" and insert -- 3B --.

Column 15, Line 30, delete "38" and insert -- 3B --.

Column 15, Line 50, delete "Integrated" and insert -- integrated --.

Column 20, Line 24, delete "Lumerncal" and insert -- Lumerical --.

Column 20, Line 56, delete "a-SiH" and insert -- a-Si:H --.

Signed and Sealed this
Nineteenth Day of May, 2020

Andrei Iancu
*Director of the United States Patent and Trademark Office*